United States Patent Office 3,652,589
Patented Mar. 28, 1972

3,652,589
1-(m-SUBSTITUTED PHENYL)-2-AMINOMETHYL CYCLOHEXANOLS
Kurt Flick, Bochum-Stiepel, and Ernst Frankus, Schleckheim, near Aachen, Germany, assignors to Chemie Grunenthal G.m.b.H., Stolberg, Rhineland, Germany
No Drawing. Continuation-in-part of application Ser. No. 357,024, Mar. 30, 1964. This application July 27, 1967, Ser. No. 656,314
Int. Cl. C07d 27/04
U.S. Cl. 260—326.5 M                    23 Claims

ABSTRACT OF THE DISCLOSURE

This invention relates to cycloalkanol-substituted phenol ethers having a basic amine group in the cycloalkyl ring, which are useful as analgesic drugs.

---

The present application is a continuation-in-part of copending application Ser. No. 357,024, filed Mar. 30, 1964 and entitled "Phenol Ethers Containing Basic Groups and a Process of Making Same," and now abandoned.

The present invention relates to new and valuable phenol ethers containing basic groups and, more particularly, to cycloalkanol-substituted phenol ethers having basic groups, to a process of making such compounds, to pharmaceutical compositions containing such compounds, and to a method of using such compounds and compositions therapeutically.

Analgesic drugs are well known. Highly effective analgesic compounds are derived from morphium, such as morphine and other morphine alkaloids. However, it is well known, that morphine as well as other morphium alkaloids produce a number of serious side-effects. More particularly they possess a high degree of tolerance and drug dependence. For this reason numerous attempts have been made to produce analgesic drugs which are substantially free of these side-effects. However, none of these attempts met with complete success.

Foster et al., for instance, disclose in "J. Pharmacol. Exptl. Therap." vol. 91, pages 195 to 209 (1947) (abstracted in "Chemical Abstracts" vol. 42, page 983 (1948); see also: Lee et al. "Jubilee Volume Emil Barell" pages 264 to 309, published Basel 1946, abstracted by Lee in "Medicinal Chemistry" vol. I, page 444, published by John Wiley and Sons, Inc., New York 1951) a numer of cyclohexanol derivatives with morphine-like pharmacological activity, in laboratory animals among them, for instance, 1 - (m-methoxy-phenyl) - 2 - piperidinomethyl cyclohexanol-(1) designated by Foster et al. as compound number Nu–640 and its propionic acid ester. These compounds, however, have not only a weak analgesic potency as stated and confirmed by Foster et al. and also in the Lee publications but also a high toxicity so that their therapeutic index is low, rendering the compounds therapeutically useless.

Slomka et al. in "J. Am. Pharm. Assn., Scientific Edition" vol. 40, pages 47 to 51 (1951) disclose compounds of the cyclohexane series which bear a structural relationship to the morphine-type analgesics, among them 1-phenyl-1-acetoxy-2 - dimethylamino methyl cyclohexane hydrochloride and 1 - phenyl - 1-acetoxy-2-diethylamino methyl cyclohexane hydrochloride.

However, these compounds as well as the unesterified 1-phenyl-1-hydroxy - 2 - dialkylamino methyl cyclohexane compounds are analgesically ineffective or, respectively, only slightly effective but of high toxicity.

It is now an object of the present invention to provide valuable therapeutically useful cycloalkanol-substituted phenol ethers with a basic group in the cycloalkyl ring and with an alkoxy group in m-position to said cycloalkyl ring, which compounds are substantially free of the disadvantages of the known, above-mentioned compounds of similar structure.

Another object of the present invention is to provide a simple and effective process of making such new and valuable phenol ethers.

A further object of the present invention is to provide pharmaceutical compositions containing, as essential active drug, such phenol ethers.

Still another object of the present invention is to provide a method of relieving pain, of suppressing coughing, and of producing other valuable therapeutic effects by the administration to needful patients of such phenol ethers.

Other objects of the present invention and advantageous features thereof will become apparent as the description proceeds.

In principle, the new and valuable phenol ethers, according to the present invention, have the following Formula I

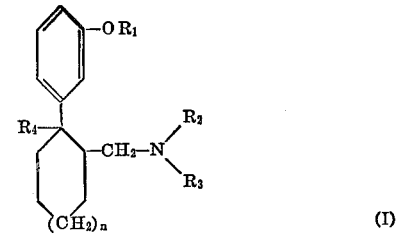

(I)

wherein:

$R_1$ indicates alkyl containing 1 to 3 carbon atoms or aralkyl, especially phenyl lower alkyl, such as benzyl or phenyl ethyl;

$R_2$ and $R_3$ represent alkyl containing 1 to 6 carbon atoms, aralkyl, especially phenyl lower alkyl, or $R_2$ and $R_3$, together with the nitrogen atom to which they are attached, form the morpholine ring or the pyrrolidine ring;

$R_4$ indicates hydroxyl, halogen, or the lower alkanoyloxy group, especially with 1 to 6 carbon atoms in the alkanoyl moiety; and $n$ represents the numerals 0, 1 or 2, and the pharmaceutically acceptable, substantially non-toxic acid addition salts of said phenol ethers.

The compounds of Formula I, especially those in which $n$ stands for the numeral 1 and $R_2$ and $R_3$ represent methyl, exhibit strong analgesic activity and are in general well tolerated. For instance the $ED_{50}$, i.e. the analgesically effective dose, after the administration of which 50% of the test animals do no longer react to pain, of the hydrochloride of 1-(m-methoxy phenyl) - 2 - dimethyl-amino methyl cyclohexanol-(1), when orally administered, is 11.2 mg./kg. of mice body weight. The $DL_{50}$, i.e. the dose causing death of 50% of the test animals of said compound, when orally administered, is 395.0 mg./kg.

In addition to said analgesic activity, the compounds of Formula I possess excellent antitussive activity. For instance, when intravenously injected, 2.5 mg. of the above-mentioned compound per kg. of cat's body weight inhibit 75% of the mechanically provoked cough reflex. Said cough reflex is also inhibited by intravenous administration of 2.5 mg. of the hydrochloride of 1-(m-methoxy phenyl)-2-pyrrolidino methyl cyclohexanol-(1) per kg. of cat's body weight to 63%, by intravenous administration of 1 mg. of the hydrochloride of 1-(m-benzyloxy phenyl)-2-pyrrolidino methyl cyclohexanol-(1) per kg. of cat's body weight to 65%, and of 2.5 mg. of the hydrochloride of 1-(m-methoxy phenyl)-2-[N-methyl-N-(β-phenyl ethyl)

amino methyl] cyclohexanol-(1) per kg. of cat's body weight to 100%, respectively.

Furthermore, it was found that some of the 2-basically substituted 1-(m-substituted phenyl) cyclohexanol-(1) compounds of Formula I have a noteworthy antiphlogistic and antihistaminic activity. Tests have also shown that the compounds have an analeptic and anticoryza effect and depress the secretion of the nasal muscosa so that they are useful in human therapy, for instance, in the treatment of bronchitis and of the common cold.

The cycloalkane ring in compounds of Formula I, according to the present invention, contains two carbon atoms, each carrying four different substituents. This configuration causes cis-trans-isomerism. The isomers can be resolved into their optically active forms by methods known per se. The cis- and trans-isomers may be separated from each other, for instance, by fractional distillation of the free bases, by recrystallization of their salts, or by other methods known per se.

The new compounds of Formula I are obtained, for instance, by reacting a basically substituted cycloalkanone compound of Formula II

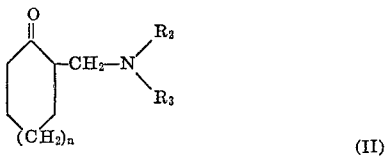

(II)

wherein $R_2$, $R_3$ and $n$ represent the same substituents and numerals as indicated above, with a phenol ether compound of Formula III

(III)

wherein:

$R_1$ represents the same substituent as indicated above, while

X represents lithium or the group MgHal wherein Hal represents halogen, in the presence of an ether, preferably a cyclic ether, and hydrolyzing the intermediate thus obtained to yield the compound of Formula I. Said compound may then be converted into its addition salts with acids and/or into its esters with lower alkanoic acids or hydrogen halides.

To esterify said compounds of Formula I with a lower alkanoic acid, they are preferably reacted with halides or anhydrides of said acids.

Reaction of the compounds of Formula II with the compounds of Formula III is preferably carried out at a temperature between —50° C. and +100° C. Hydrolysis of the intermediates is effected by treating the reaction mixture, preferably while cooling, with water which may contain ammonium salts, or with dilute acids.

The following examples serve to further illustrate the present inventon without, however, limiting the same thereto. The melting points and boiling points given have not been corrected.

EXAMPLE 1

Five g. of magnesium turnings are added, while stirring, to a mixture of 37.4 g. of m-bromo anisol and 160 ml. of absolute tetrahydrofuran at such a rate that the reaction mixture boils gently due to the heat produced by the immediately starting reaction. Thereafter, the reaction mixture is refluxed, while being stirred, until the magnesium is completely dissolved. The reaction mixture is cooled to between 0° C. and —10° C. and a mixture of 23.25 g. of 2-dimethylamino methyl cyclohexanone and 45 ml. of absolute tetrahydrofuran is added dropwise thereto. The mixture is stirred at room temperature for about 4 hours and is then poured slowly, while stirring, into a mixture of 25 g. of ammonium chloride, 50 ml. of water, and 50 g. of ice. The layers formed thereby are separated and the aqueous layer is extracted twice with 50 ml. of ether each. The organic solvent layers are combined, dried over sodium sulfate, and the solvents are evaporated. The residue is distilled, whereby 1 - (m-methoxy phenyl) - 2 - dimethylamino methyl cyclohexanol-(1) is obtained in a yield of 78.6% of the theoretical yield. Boiling point: 138–140° C./0.6 mm. Hg. The hydrochloride obtained from said base, for instance, by dissolving it in ether and treating the solution with dry hydrogen chloride, melts at 168–175° C.

The pharmacological test results given hereinabove in column 2 were obtained with said reaction product which is a mixture of the cis- and trans-isomers.

14.7 g. of the above-mentioned hydrochloride are dissolved in 150 ml. of acetic acid anhydride. The solution is heated under reflux for three hours. The solvent is then distilled off in a vacuum. The oily residue is dissolved in acetone. Ether is added thereto until crystallization sets in. The mixture is allowed to stand and the crystals are filtered off. Thereby the hydrochloride of 1 - (m-methoxy phenyl) - 1 - acetoxy - 2 - dimethylamino methyl cyclohexane, melting at 150–155° C., is obtained.

By using the same amount of propionic acid anhydride and proceeding in the same manner as described above, the hydrochloride of 1 - (m-methoxy phenyl) - 1 - propionoxy - 2 - dimethylamino methyl cyclohexane of the melting point 198–199° C. is obtained.

EXAMPLE 2

Separation of the trans- and cis-isomers 500 g. of the hydrochloride of 1-(m-methoxy phenyl)-dimethylamino methyl cyclohexanol-(1), i.e. of the mixture of the cis- and trans-form as obtained according to Example 1 are heated under reflux with a mixture of 2,500 ml. of anhydrous dioxane and 25 cc. of water for one hour while stirring. The resulting solution is filtered while still hot. The filter residue is again heated under reflux with 1,250 ml. of anhydrous dioxane and filtered while hot. The filter residue obtained thereby is dried until the dioxane is completely removed therefrom. About 300 g. of the hydrochloride of the pure trans-form, i.e. of the racemic 1(e) - (m-methoxy phenyl) - 2(e) - dimethylamino methyl cyclohexane-1(a)-ol, are obtained thereby. Melting point: 180–181° C.

The dioxane filtrate yields, on cooling, about 200 g. of white crystals of the melting point 163–165° C. These crystals are a mixture of about 20% to 30% of the cis-isomer and about 70% to 80% of the trans-isomer. This mixture cannot be further separated by boiling with dioxane.

The hydrochloride of the pure cis-form, i.e. of the racemic 1(e) - (m-methoxy phenyl) - 2(a) - dimethylamino methyl cyclohexane-1(a)-ol is obtained from said mixture by finely pulverizing said 200 g. in a mortar and stirring it with 2000 ml. of dichloro methane at room temperature for one hour. Thereby, the cis-isomer is not dissolved. After filtering the solution and recrystallizing the filter residue by dissolving it in methanol and adding ether thereto until crystallization sets in, the resulting purified cis-isomer has a melting point of 200–201° C.

The dichloro methane filtrate yields, on evaporation, a residue which consists of the substantially pure trans-isomer.

EXAMPLE 3

Resolving the transi-somer into its optically active forms 50 g. of the hydrochloride of the racemic 1(e) - (m-methoxy phenyl) - 2(e) - dimethylaminomethyl cyclohexane - 1(a) - ol are dissolved in 200 ml. of water. Solid sodium carbonate is added thereto until the solution is of strongly alkaline reaction. The alkaline solution is repeatedly extracted with ether, the ether extracts are combined and dried over sodium sulfate. On distilling off the ether, the racemic 1(e) - (m-methoxy phenyl)-2(e)-dimethylamino methyl cyclohexane-1(a)-ol is obtained in the form of an oil boiling at 106–110° C./0.01 mm. Hg.

27 g. of said racemic base are dissolved in 100 ml. of acetic acid ethyl ester and the solution is heated under reflux. A solution of 40 g. of dibenzoyl-D-tartaric acid in 200 ml. of acetic acid ethyl ester is added drop by drop thereto. The mixture is heated for two hours. On cooling, 63 g. of the dibenzoyl-D-tartaric acid salt of racemic 1(e)-(m-methoxy phenyl)-2(e)-dimethylamino methyl cyclohexane-1(a)-ol are obtained.

5 g. of said salt are treated under reflux with 50 ml. of acetic acid ethyl ester for 10 minutes. The hot mixture is filtered. 2.0 g. to 2.2 g. remain as undissolved filter residue. They are recrystallized by dissolving in isopropanol and adding ether thereto until crystallization sets in, and represent the pure dibenzoyl-D-tartaric acid salt of (—) - 1(e) - (m-methoxy phenyl)-2(e)-dimethylamino methyl cyclohexane-1(a)-ol of the melting point 132–134° C.; optical rotation $[\alpha]^{25} = -76.2°$ (in 96% ethanol).

On cooling the acetic acid ethyl ester solution, 2.4 g. of the dibenzoyl-D-tartaric acid salt of (+)-1(e)-(m-methoxy phenyl) - 2(e) - dimethylamino methyl cyclohexane-1(a)-ol are obtained. They are recrystallized from acetic acid ethyl ester. Melting point: 111–114° C.; optical rotation $[\alpha]^{25} = -53°$ (in 96% ethanol).

The hydrochlorides of the optically active bases are obtained from said optically active dibenzoyl-D-tartaric acid salts in the following manner:

2 g. of dibenzoyl-D-tartaric acid salt are dissolved in a mixture of 20 ml. of water and 20 ml. of methanol. An excess of a 20% aqueous sodium hydroxide solution is added thereto. The mixture is repeatedly extracted with ether. The combined ether extracts are dried over sodium sulfate. The ether is then distilled off in a vacuum. The resulting residue is dissolved in acetone and is carefully neutralized by the addition of an ethanol solution of hydrogen chloride while cooling with ice. On addition of ether, the hydrochlorides precipitate in the form of hygroscopic crystals. After drying in a vacuum, the optically active crystals are no more hygroscopic.

The hydrochloride of the (—)-1(e)-(m-methoxy phenyl)-2(e)-dimethylamino methyl cyclohexane-1(a)-ol has a melting point of 169–170° C.; optical rotation $[\alpha]^{20} = -28.0°$ (in water).

The hydrochloride of the (+)-1(e)-(m-methoxy phenyl)-2(e)-dimethylamino methyl cyclohexane-1(a)-ol has a melting point of 169–170° C.; optical rotation $[\alpha]^{20} = +27.5°$ (in water).

When mixing said two optically active hydrochlorides in the proportion 1:1, the resulting mixture corresponds in its melting point and solubility to the racemic starting hydrochloride.

EXAMPLE 4

2.63 g. of the racemic base 1(e)-(m-methoxy phenyl)-2(e)-dimethyl aminomethyl cyclohexane-1(a)-ol obtained according to Example 3, are dissolved in 5 ml. of acetone. 1.16 g. of maleic acid dissolved in 4 ml. of acetone are added thereto. On adding ether to the solution, the maleic acid addition salt of the starting base crystallizes and is filtered off. Its melting point is 68–70° C.

EXAMPLE 5

Following the procedure described in Example 1 but using 2.5 g. of magnesium turnings, 18.7 g. of m-bromo anisol, dissolved in 80 ml. of absolute tetrahydrofuran, and 12.7 g. of 2-dimethylamino methyl cycloheptanone, dissolved in 25 ml. of absolute tetrahydrofuran, 1-(m-methoxy phenyl)-2-dimethylamino methyl cycloheptanol-(1) is obtained in a yield of 73.8% of the theoretical yield. Boiling point: 125° C./0.003 mm. Hg. Its hydrochloride melts at 177–181° C.

In the same manner there are obtained, by reacting m-methoxy phenyl magnesium bromide with the appropriate basic ketones, the following compounds:

EXAMPLE 6

1-(m-methoxy phenyl)-2-morpholino methyl cyclohexanol-(1); boiling point: 182–183° C./0.02 mm. Hg; yield: 43.7%; melting point of the hydrochloride: 231–233° C.

EXAMPLE 7

1-(m-methoxy phenyl)-2-pyrrolidino methyl cyclohexanol-(1); boiling point: 145–147° C./0.15 mm. Hg; yield: 55.5%; melting point of the hydrochloride: 174–178° C.

EXAMPLE 8

1 - (m - methoxy phenyl) - 2 - [N - methyl - N - (β-phenyl ethyl) amino methyl]cyclohexanol-(1); boiling point: 167° C./0.006 mm. Hg; yield 56.7%.

EXAMPLE 9

Five g. of magnesium turnings are treated, while stirring, with a solution of 1 ml. of ethyl bromide in 15 ml. of absolute tetrahydrofuran. A solution of 39.5 g. of m-bromo phenol benzylether in 150 ml. of absolute tetrahydrofuran is added to the warm reaction mixture at such a rate that the mixture boils gently. After refluxing for one further hour, the mixture is chilled to 0° C. to —10° C. A solution of 23.3 g. of 2-dimethylamino methyl cyclohexanone in 45 ml. of absolute tetrahydrofuran is added drop by drop thereto, while stirring. The reaction mixture is then stirred at room temperature for four more hours and is slowly poured into a stirred mixture of 25 g. of ammonium chloride, 50 ml. of water, and 50 g. of ice. The layers formed thereby are separated and the aqueous layer is extracted twice with 50 ml. portions of ether. The combined organic solvent layers are dried over sodium sulfate and the solvents are evaporated. On distillation, the residue yields 1-(m-benzyloxy phenyl)-2-dimethylamino methyl cyclohexanol-(1), boiling at 156–160° C./0.003 mm. Hg. Yield: 61% of the theoretical yield. The hydrochloride of this compound melts at 141–143° C.

By treating the hydrochloride with thionylchloride, the hydrochloride of 1 - (m - benzyloxy phenyl) - 1 - chloro-2-dimethylamino methyl cyclohexane is obtained. It melts, after recrystallization from ethanol/ether, at 150–151° C.

By proceeding in the same manner as described in Example 9 there are obtained by reaction of m-benzyloxy phenyl magnesium bromide with the appropriate basic ketones the following compounds:

EXAMPLE 10

1 - (m - benzyloxy phenyl) - 2 - dimethylamino methyl cycloheptanol-(1), boiling point: 167–172° C./0.004 mm. Hg; yield: 45.3%; melting point of the hydrochloride: 140–143° C. Treatment with thionylchloride yields the hydrochloride of 1 - (m - benzyloxy phenyl) - 1-chloro-2-dimethylamino methyl cycloheptane, melting at 124–125° C.

EXAMPLE 11

1 - (m - benzyloxy phenyl) - 2 - pyrrolidino methyl cyclohexanol-(1), boiling point: 175–178° C./0.0002 mm. Hg; yield: 27.4%; melting point of the hydrochloride: 171–173° C.

EXAMPLE 12

1 - (m - benzyloxy phenyl) - 2 - [N - methyl - N - (β-phenyl ethyl) amino methyl] cyclohexanol-(1), boiling point: 220–221° C./0.001 mm. Hg; yield: 46.6%; melting point of the hydrochloride: 173–175° C.

EXAMPLE 13

1 - (m - benzyloxy phenyl) - 2 - (N - methyl - N-benzylamino methyl) cyclohexanol-(1); boiling point: 208–210° C./0.001 mm. Hg; yield: 40.1%; melting point of the hydrochloride: 188–190° C.

EXAMPLE 14

1 - (m - benzyloxy phenyl) - 2 - morpholino methyl cyclopentanol-(1), boiling point: 200–205° C./0.007 mm. Hg; yield: 43.6%; melting point of the hydrochloride: 169–170° C.

EXAMPLE 15

2.8 g. of small pieces of lithium are added to 150 ml. of absolute ether stored under nitrogen. A few ml. of a solution of 27.5 g. of butyl bromide in 50 ml. of absolute ether are admixed thereto, while stirring. As soon as reaction has set in, the mixture is chilled to −10° C. and the remaining portion of the butyl bromide solution is added dropwise. The reaction mixture is stirred at 0° C. to +10° C. for 2 hours and then chilled to −40° C. to −50° C. While stirring, a solution of 39.5 g. of m-bromo phenol benzyl ether in a mixture of 60 ml. of absolute ether and 90 ml. of absolute tetrahydrofuran, is added slowly. Thereafter, a solution of 23.3 g. of 2-dimethylamino methyl cyclohexanone in 45 ml. of absolute ether is added dropwise thereto. The reaction mixture is stirred at −40° C. for 2 hours. The temperature of the reaction mixture is then allowed to slowly increase to room temperature. The reaction mixture is worked up in the same manner as described in Examples 1 and 9. The same product as in Example 9 is obtained in a yield of 49.1% of the theoretical yield.

EXAMPLE 16

The procedure is the same as described in Example 1. There are used, however, 5 g. of magnesium turnings, 40.2 g. of m-ethoxy bromo benzene dissolved in 160 ml. of absolute tetrahydrofuran, and 23.3 g. of 2-dimethylamino methyl cyclohexanone dissolved in 45 ml. of absolute tetrahydrofuran. 1 - (m - ethoxy phenyl) - 2- dimethylamino methyl cyclohexanol-(1) is obtained thereby. Its boiling point is 134–135° C./0.02 mm. Hg. Melting point of the hydrochloride: 170–175° C.

In place of m-bromo anisol, m-bromo phenol benzyl ether, and m-bromo phenol ethyl ether as used as the one reaction component in the preceding examples, there may be employed equimolecular amounts of other m-halogenated phenol ethers such as m-iodo phenol ethyl ether, m-bromo phenol n-propyl ether, m-bromo phenol isopropyl ether, m-iodo phenol β-phenyl ethyl ether and the like m-halogenated alkyl or aralkyl phenol ethers while otherwise the procedure is the same as described in said examples.

In place of 2-dimethylamino methyl, 2-morpholino methyl, 2-pyrrolidinomethyl, 2-[N-methyl-N-(β-phenyl ethyl) amino methyl], 2-(N-methyl-N-benzylamino methyl) cyclopentanones, cyclohexanones, or cycloheptanones used in the preceding examples, there may be employed equimolecular amounts of cyclopentanones, cyclohexanones, or cycloheptanones which are substituted in 2-position by the diethylamino methyl, di-n-propylamino methyl, di-isobutylamino methyl, dipentylamino methyl, dihexylamino methyl, N-methyl-N-ethylamino methyl, dibenzylamino methyl, di-β-phenyl ethylamino methyl, N-butyl-N-benzylamino methyl, and the like basic groups while otherwise the procedure is the same as described in said examples.

The hydroxyl group attached to the cycloalkyl ring in 1-position may be converted into the bromo, iodo, fluoro substituent or into the formyloxy, propionyloxy, butyroyloxy, valeroyloxy, and the like lower alkanoyloxy groups by halogenating or acylating agents according to methods known per se.

As stated hereinabove, the new cycloalkyl-substituted phenol ethers having a basic group attached to the cycloalkyl ring as well as their esters with hydrogen halides or lower alkanoic acids can be converted into their acid addition salts. In addition to the hydrochlorides and maleate described hereinabove, other acid addition salts with pharmaceutically acceptable, substantially non-toxic inorganic and organic acids, such as nitric acid, sulfuric acid, phosphoric acid, hydrobromic acid, acetic acid, propionic acid, malonic acid, succinic acid, citric acid, tartaric acid, malic acid, benzoic acid, salicylic acid, phthalic acid, nicotinic acid, and others may also be prepared according to conventional methods of producing such acid addition salts.

Pharmacological tests were carried out with the compounds according to the present invention and with the above-mentioned known compounds of similar structure, especially with the compound designated as Nu-640 by Foster et al. and disclosed by Lee in "Medicinal Chemistry," Lee et al., and Foster et al. as mentioned hereinabove. The following Table I represents the results obtained on testing the compounds for their analgesic and antitussive activity as well as for their toxicity. The therapeutic index, i.e. the quotient $LD_{50}/ED_{50}$, is given for some of the compounds.

TABLE I

| No. | Compound | Analgesic activity $ED_{50}$ (mice) | Antitussive activity (cats) | Toxicity $LD_{50}$ (mice) | Therapeutic index |
|---|---|---|---|---|---|
| 1 | 1-(m-methoxyphenyl)-2-piperidino methyl cyclohexanol-(1); Compound Nu 640 of Foster et al. | About 175 mg./kg. on oral administration. Convulsions! | 1.0 mg./kg. no effect; 10 mg./kg. slight inhibition; toxic side-effects. | 472–551 mg./kg. oral; 333–433 mg./kg. subcutan. 31.2–37.6 mg./kg. i.v. | 2.2–2.9. |
| 2 | 1-phenyl-2-dimethylamino methyl cyclohexanol-(1). Unacylated compound (C) (1) of Slomka et al. | With 50 mg./kg. no effect on oral administration. | On i.v. administration of 2.5 mg./kg. no effect. | | |
| 3 | Propionic acid ester of No. 2. Next higher homologue of the Slomka et al. compound (C) (1). | With 50 mg./kg. no effect on oral administration. | On i.v. administration of 2.5 mg./kg. no effect. | | |
| 4 | Acetic acid ester of 1-phenyl-2-diethylaminomethyl cyclohexanol-(1). Compound (C) (2) of Slomka et al. | 50 mg./kg. on oral administration. | Not determined | 68 mg./kg | 1.36. |
| 5 | 1-(p-methoxy-phenyl)-2-pyrrolidino methyl cyclohexanol-(1). | 100 mg./kg. Convulsions! | No effect | | |
| 6 | 1-(m-methoxyphenyl)-2-dimethylamino methyl cyclohexanol-(1). Compound of Example 1; mixture of cis- and trans-isomers. | 11.2 mg./kg. on oral administration. | 75% inhibition on i.v. administration of 2.5 mg./kg. | 395 mg./kg. on oral administration. | 35.2. |
| 7 | Racemic (e)-(m-methoxy phenyl)-2(e)-dimethylamino methyl cyclohexane-1(a)-ol. Compound of Example 2; trans-isomer. | 9.2 mg./kg. on oral administration. 10.3mg./kg. on subcutan. administration. | | 510 mg./kg. on oral administration. 58 mg./kg. on i.v. administration. | 55. |

TABLE I—Continued

| No. | Compound | Analgesic activity ED₅₀ (mice) | Antitussive activity (cats) | Toxicity LD₅₀ (mice) | Therapeutic index |
|---|---|---|---|---|---|
| 8 | Racemic 1(e)-(m-methoxy phenyl)-2(a)-dimethylamino methyl cyclohexane-1(a)-ol. Compound of Example 2; cis-isomer. | Between 50 mg./kg. and 100 mg./kg. on subcutan. administration. | | 61 mg./kg. on i.v. administration. | Estimated 5–10. |
| 9 | (+)-1(e)-(m-methoxy phenyl)-2(e)-dimethylamino methyl cyclohexane-1(a)-ol. Compound of Example 3; D-form of trans-isomer. | 9.5 mg./kg. on oral administration. 6.0 mg./kg. on subcut. administration. | | 425 mg./kg. on oral administration. 45 mg./kg. on i.v. administration. | 45. |
| 10 | (−)-1(e)-(m-methoxy phenyl)-2(e)-dimethyl amino methyl cyclohexane)-1(a)-ol. Compound of Example 3; L-form of trans-isomers. | 77 mg./kg. on oral administration. 63 mg./kg. on subcut. application. | | 465 mg./kg. on oral administration. 57 mg./kg. on i.v. administration. | 6. |
| 11 | 1-(m-methoxy phenyl)-2-morpholino methyl cyclohexanol-(1) of Example 6. | | 54% or, resp., 62% cough inhibition on intravenous administration of 1 mg./kg. or, resp., 2.5 mg./kg. | | |
| 12 | 1-(m-methoxy phenyl)-2-pyrrolidino methylcyclohexanol-(1) of Example 7. | | 47% or, resp., 61% cough inhibition on intravenous administration of 1 mg./kg. or resp., 2.5 mg./kg. | | |
| 13 | 1-(m-ethoxy phenyl)-2-dimethyl-amino methyl cyclohexanol-(1) of Example 16. | About 30 mg./kg. | | | |
| 14 | 1-(m-methoxy phenyl)-2-dimethylamino methyl cycloheptanol-(1) of Example 5. | 50 mg./kg. | | | |
| 15 | 1-(m-benzyloxy phenyl)-2-dimethylaminomethyl cyclohexanol-(1) of Example 9. | 25–50 mg./kg. | | | |
| 16 | 1-(m-benzyloxyphenyl)-2-dimethylamino methyl cycloheptanol-(1) of Example 10. | | 50% cough inhibition on intravenous administration of 1 mg./kg. | | |
| 17 | 1-(m-benzyloxyphenyl)-2-[N-methyl-N-(β-phenyl ethyl) amino methyl] cyclohexanol-(1) of Example 12. | | 72% cough inhibition on intravenous administration of 1 mg./kg. | | |
| 18 | 1-(m-benzyloxy phenyl)-2-pyrrolidino methyl cyclohexanol-(1) of Example 11. | | | 65% inhibition on i.v. administration of 1 mg./kg. | |
| 19 | 1-(m-methoxy phenyl)-2-N-methyl-N-(β-phenyl ethyl) amino methyl cyclohexanol-(1) of Example 8. | | | 50% inhibition on i.v. administration of 1 mg./kg., 100% inhibition on i.v. administration of 2.5 mg./kg. | |

It is evident that the compounds according to the present invention have a high analgestic activity and a low toxicity so that their therapeutic index is very substancially higher than that of the known compounds described by Lee, Foster et al., and Slomka et al.

In addition thereto most of the compounds according to the present invention have an excellent antitussive activity.

Furthermore, the compounds of this invention and expecially 1-(m-methoxy phenyl)-2-dimethylamino methyl cyclohexanol-(1) and its trans-isomer do not affect respiration and blood circulation while the known compound designated as Nu–640 causes depression of respiration and a considerable decrease in blood pressure. The compound according to this invention does not produce any change in the electroencephalogram.

Tests carried out with guinea pigs which are subjected to ultraviolet irradiation until erythema formation show that intramuscular injection of 10 mg./kg. of the trans-isomer of 1-(m-methoxy phenyl)-2-dimethylamino methyl cyclohexanol-(1) causes complete suppression of the erythema up to five hours after irradiation. In contrast thereto the known compound Nu–640 is without effect under these conditions when the same dose is administered. Thus, the compound according to this invention exhibits a pronounced antiphlogistic and anti-inflammatory effect.

Further pharmacological tests with mice and rats indicate that the compounds according to the present invention and especially the trans-isomer of 1-(m-methoxy phenyl)-2-dimethylaminomethyl cyclohexanol-(1) do not cause addition, i.e. drug dependence, and that they have a low degree of tolerance, i.e. that the dosis to produce the same degree of physiological effect need not be increased on repeated administration.

The new compounds are administered orally in the form of powders, tablets, dragées, lozenges, or other solid shaped or liquid preparations. Parenteral and especially intramuscular or intravenous administration in the form of aqueous solutions of their water soluble acid addition salts or of suspensions of the free bases, and rectal administration in the form of suppositories and the like is also possible.

Preparations to be administered orally are obtained for instance, by diluting the active compounds with a solid pulverulent extending agent or pharmaceutical carrier to form an intimate mixture thereof. The components of said mixture are, for instance, intimately mixed in a ball mill or the like device to the desired degree of fineness, or the finely powdered solid carrier is impregnated with a solution of said compound in water or in other suitable solvents, whereafter the water or solvent is removed by evaporation, preferably while milling.

Tablets, pills, dragées, and the like compressed and shaped preparations are prepared by using the commonly employed diluting agents, binders and the like additives, such as sugar, lactose, talc, starch, bolus alba, pectin; as binders gelatin, gum arabic, methyl cellulose, yeast extract, agar, tragacanth; as lubricants, stearic acid, magnesium stearate, and others.

The following examples serve to illustrate compositions containing the new cycloalkanol substituted phenol ethers with a basic group in the cycloalkanol ring according to the present invention as they are used in therapy without, however, limiting the same thereto.

EXAMPLE 17

50 g. of the hydrochloride of 1-m-methoxy phenyl-2-dimethylamino methyl cyclohexanol-(1) obtained according to Example 1 and representing the mixture of the trans- and cis-isomers and designated hereinafter as compound A, are intimately mixed with 338 g. of starch, 144 g. of lactose, and 4 g. of o-benzoic acid sulfimide sodium. The mixture is granulated with 140 g. of a 10% aqueous starch paste. The moist granulate is passed through a 1 mm. sieve, dried at 40° C., and again passed through such a sieve. The resulting granulate is mixed with 20 g. of starch, 9 g. of talc, and 1 g. of magnesium stearate. Said mixture is tabletted to tablets of 590 mg., each and a diameter of 13 mm. Each tablet contains 50 mg. of the active agent.

EXAMPLE 18

Capsules, each containing 75 mg. of the hydrochloride of the racemic 1(e)-(m-methoxy phenyl)-2-(e)-dimethylamino methyl cyclohexane-1(a)-ol obtained according to Example 2 and designated hereinafter as compound B, are prepared by intimately mixing 75 g. of said compound with 38.5 g. of dicalcium phosphate, 1.25 g. of liquid paraffin (German Pharmacopeia VI) and 0.25 g. of magnesium stearate, sieving said mixture, and filling 115 mg. of said mixture into each gelatin capsule.

EXAMPLE 19

5 g. of compound A, 20 g. of saccharose, 0.15 g. of p-hydroxy benzoic acid methyl ester, and 0.5 g. of o-benzoic acid sulfimide sodium are dissolved in water and the solution is made up to a volume of 100 ml. by the addition of distilled water. Flavoring agents are added. The resulting solution is filled in drop-bottles. Each ml. of the solution contains 50 mg. of the active compound.

EXAMPLE 20

197.5 g. of cocoa butter or the same amount of a synthetic suppository base are melted and triturated with 2.5 g. of compound B. The mixture is poured into suppository molds each containing 2 g. of the mixture, and the mold is cooled to solidify the suppositories. Each suppository contains 25 mg. of the active compound.

EXAMPLE 21

50 g. of the hydrochloride of (+)-1(e)-(m-methoxy phenyl)-2(e)-dimethylamino methyl cyclohexane-1(a)-ol obtained according to Example 3 and designated hereinafter as compound C, 260 g. of starch, 96 g. of lactose, and 4 g. of o-benzoic acid sulfimide sodium are granulated, sieved and dried at 40° C. as described in Example 17. The granulate is mixed with 20 g. of starch, 9 g. of talc, and 1 g. of magnesium stearate and pressed to tablets of 450 mg. each and of a diameter of 12 mm. serving as dragée cores. These cores are sugarcoated in the conventional manner to yield dragées, each containing 50 mg. of compound C.

EXAMPLE 22

2.0 g. of compound B and 2 g. of sodium citrate are dissolved in 200 ml. of water. The resulting solution is filtered to remove fibers and is filled in ampoules containing 10.0 ml. of the active compound B per ml. The filled ampoules are sterilized by heating to 120° C. The resulting solution is used for administration by intramuscular injection.

Of course, by variation and calculation of the ingredients tablets and other compositions are prepared containing lower or higher amounts of the essential active agents as desired. For instance, the tablets of Example 17 may contain 25 mg., 75 mg. or 100 mg. of compound A, the gelatin capsules of Example 18 25 mg., 75 mg. or 100 mg. of compound B, the dragées of Example 21 25 mg., 75 mg. or 100 mg. of compound C, or the injectable solutions of Example 22 2.5 mg., 5 mg., 25 mg. or 50 mg. of compound B.

As is evident from Examples 17 to 22, the essential active ingredient is incorporated into dosage unit forms, each containing a calculated amount of the essential active ingredient to provide the particular desired therapeutic effect. Generally the unit dosage forms are prepared by suitable admixing with a pharmaceutical carrier, either solid or liquid, which constitutes a major amount of the dosage unit form as described, for instance, in Examples 17 to 22.

The particular form of the above given compositions of Examples 17 to 22 and the like preparations in which the essential active ingredient is administered orally, rectally, intramuscularly, intravenously or otherwise is formulated and prepared to supply an effective amount of the said ingredient for the desired therapeutic effect, for instance, analgesic action, antitussive action, and others, especially without deleterious tolerance and addiction liability.

Extensive clinical tests have been carried out with the compositions of Examples 17 to 22 containing the compounds of Examples 1 to 3, i.e. the hydrochloride of the mixture of trans- and cis-isomers of 1-(m-methoxy phenyl)-2-dimethylamino methyl cyclohexanol (1) and the hydrochloride of the trans-isomer the 1(e)-(m-methoxy phenyl)-2(e) dimethylamino methyl cyclohexane-1(a)-ol. Numerous patients were treated for the following indications: headaches, pain due to wounds, pain due to fractures, carcinoma and metastases, backaches, peripheral circulatory disturbances, pain due to arthrosis, neuralgiform and neuritic pain, abdominal pain, pain due to acute rheumatism, preoperatively in place of opiates, neuritis diabetica, lumbago and myalgias, toothache, pain due to pneumonia and pleuritis, dysmenorrhea and pain post partum, stenocardic pain. Most of these patients were seriously ill.

Oral administration of single doses between about 25 mg. and about 100 mg. and preferably of 50 mg. or 75 mg. and a daily dose between 100 mg. and 600 mg. and intramuscular administration of single doses between about 10 mg. and about 50 mg. and preferably of 2 times 25 mg. in preparation for operations and to combat post-operative pain and up to 4–8 times 25 mg. daily in intervals has proved to be highly effective.

Substantially no side-effects and especially no effect on blood pressure, pulse rate, liver function, and respiration was observed. Of special value is the observation that these compounds do not cause fatigue and tiredness and thus do not affect the ability of the treated patient, for instance, to drive a car or to cope with the problems of modern traffic.

It was also found in clinical tests on children and adults that the compounds according to the present invention have a noteworthy anticoryza effect, i.e. that they decrease the secretion of the nasal mucosa and thus that they are useful as anticold remedies. The doses administered are about the same as given hereinabove.

The compounds according to the present invention have also proven to be of considerable therapeutic value when used in combination with other therapeutically active agents whereby frequently a synergistic effect is observed. Especially valuable combinations are those with other analgesics such as with acetylsalicylic acid, phenacetin, or the like; with other antiphlogistic and antiinflammatory agents, such as with phenyl butazone, or the like; with analeptics such as with caffeine and amphetamine, or the like; with antihistaminic agents, such as with pyribenzamine, diphenylhydramine salicylate, chlorphenirimine maleate, and others, with spasmolytic agents, such as the methosulfate of (1-methyl piperidyl-2)-methyl benzilate, atropine sulfate, or the like; with muscle relaxants, such as with mephenesin, phenaglycodol, or the like; with sedative agents, such as barbituric acid derivatives, for instance, phenobarbitol, with chlorpromazine or the like.

The following example illustrates the composition of such combination preparations without, however, limiting the same thereto.

EXAMPLE 23

Tablets which are composed as follows are compared in the conventional manner:

25 mg. of the hydrochloride of racemic 1(e)-(m-methoxy phenyl) - 2(e) - dimethylamino methyl cyclohexane-1 (a)-ol,
30 mg. of pentobarbital sodium,
250 mg. of ethoxy benzamide
250 mg. of p-acetamino phenol Of course, many changes and variations in the starting materials and reaction components, in the reaction conditions, temperature, and duration, in the methods used for isolating and purifying the reaction products and for converting them into their esters and acid addition salts, and the like may be made by those skilled in the art in accordance with the principles set forth herein and in the claims annexed hereto.

We claim:
1. The phenol ether compound selected from the group consisting of the cycloalkanol-substituted phenol ether compound having a basic group in its cycloalkyl ring, said compound being of the formula

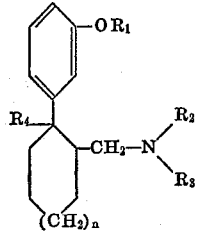

wherein $R_1$ indicates a member selected from the group consisting of alkyl with 1 to 3 carbon atoms and phenyl lower alkyl;

$R_2$ and $R_3$ indicate members selected from the group consisting of alkyl with 1 to 6 carbon atoms, phenyl lower alkyl, and $R_2$ and $R_3$, together with the nitrogen atom to which they are attached, forming the morpholine ring and the pyrrolidine ring;

$R_4$ indicates a member selected from the group consisting of hydroxyl, halogen, and the lower alkanoyloxy group; and $n$ indicates the numerals from 0 to 2;

and its pharmaceutically acceptable, substantially nontoxic acid addition salts.

2. The cyclohexanol-substituted phenol ether compound of the formula

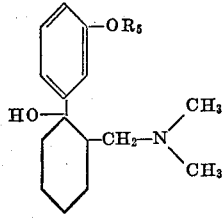

wherein $R_5$ is alkyl with 1 to 3 carbon atoms.

3. The pharmaceutically acceptable, substantially nontoxic acid addition salts of the cyclohexanol-substituted phenol ether compound of the formula

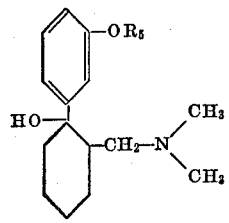

wherein $R_5$ is alkyl with 1 to 3 carbon atoms.

4. The cyclohexanol-substituted phenol ether compound of the formula

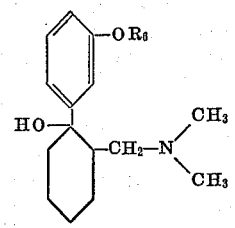

wherein $R_6$ is phenyl lower alkyl.

5. The pharmaceutically acceptable, substantially nontoxic acid addition salts of the cyclohexanol substituted phenol ether compound of the formula

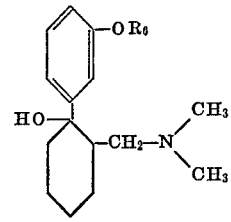

wherein $R_6$ is phenyl lower alkyl.

6. 1-(m-methoxy phenyl)-2-dimethylamino methyl cyclohexanol-(1).

7. The hydrochloride of 1-(m-methoxy phenyl)-2-dimethylamino methyl cyclohexanol-(1).

8. 1-(m-methoxy phenyl)-2-pyrrolidino methyl cyclohexanol-(1).

9. The hydrochloride of 1-(m-methoxy phenyl)-2-pyrrolidino methyl cyclohexanol-(1).

10. 1-(m-benzyloxy phenyl)-2-pyrrolidino methyl cyclohexanol-(1).

11. The hydrochloride of 1-(m-benzyloxy phenyl)-2-pyrrolidino methyl cyclohexanol-(1).

12. 1-(m-methoxy phenyl)-2 - [N-methyl-N-(β-phenyl ethyl) amino methyl] cyclohexanol-(1).

13. The hydrochloride of 1-(m-methoxy phenyl)-2-[N-methyl-N-(β-phenyl ethyl)amino methyl] cyclohexanol-(1).

14. The racemic 1(e)-(m-methoxy phenyl) - 2(e) - dimethylamino methyl cyclohexane-1(a)-ol.

15. The hydrochloride of the racemic 1(e)-(m-methoxy phenyl)-2(e)-dimethylamino methyl cyclohexane-1(a)-ol.

16. The pharmaceutically acceptable, substantially nontoxic acid addition salts of the racemic 1(e)-(m-methoxy phenyl)-2(e)-dimethylamino methyl cyclohexane-1(a)-ol.

17. (+)-1(e) - (m-methoxy phenyl)-2(e)-dimethylamino methyl cyclohexane-1(a)-ol.

18. The hydrochloride of the (+)-1(e)-(m-methoxy phenyl)-2(e)-dimethylamino methyl cyclohexane-1(a)-ol.

19. The pharmaceutically acceptable, substantially nontoxic acid addition salts of the (+)-1(e)-(m-methoxy phenyl)-2(e)-dimethylamino methyl cyclohexane-1(a)-ol.

20. The racemic trans-isomer of the phenol ether compound selected from the group consisting of the cycloalkanol-substituted phenol ether compound having a basic group in its cycloalkyl ring, said compound being of the formula

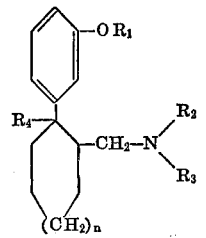

wherein $R_1$ indicates a member selected from the group consisting of alkyl with 1 to 3 carbon atoms and phenyl lower alkyl;

$R_2$ and $R_3$ indicate members selected from the group consisting of alkyl with 1 to 6 carbon atoms, phenyl lower alkyl, and $R_2$ and $R_3$, together with the nitrogen atom to which they are attached, forming the morpholine ring and the pyrrolidine ring;

$R_4$ indicates a member selected from the group consisting of hydroxyl, halogen, and the lower alkanoyloxy group; and $n$ indicates the numerals from 0 to 2;

and its pharmaceutically acceptable, substantially non-toxic acid addition salts.

21. The dextro-rotatory form of the trans-isomer of the phenol ether compound selected from the group consisting of the cycloalkanol-substituted phenol ether compound having a basic group in its cycloalkyl ring, said compound being of the formula

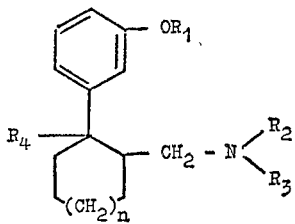

wherein $R_1$ indicates a member selected from the group consisting of alkyl with 1 to 3 carbon atoms and phenyl lower alkyl;

$R_2$ and $R_3$ indicate members selected from the group consisting of alkyl with 1 to 6 carbon atoms, phenyl lower alkyl, and $R_2$ and $R_3$ together with the nitrogen atom to which they are attached, forming the morpholine ring and the pyrrolidine ring;

$R_4$ indicates a member selected from the group consisting of hydroxyl, halogen, and the lower alkanoyloxy group; and $n$ indicates the numerals from 0 to 2;

and its pharmaceutically acceptable, substantially non-toxic acid addition salts.

22. The racemic trans-isomer of the phenol ether compound of claim 20 wherein $R_1$ is alkyl of 1 to 3 carbon atoms and benzyl, $R_2$ and $R_3$ are each methyl, $R_4$ is hydroxyl, and $n$ is 1.

23. The dextro-rotatory form of the phenol of claim 22.

References Cited

UNITED STATES PATENTS 3,100,205    8/1963    Schulte et al. _____ 260—247.2

OTHER REFERENCES

Foster et al.: Chem. Abs. 42: 984 f. 1948.
Lee et al.: Medicinal Chemistry, vol. 1, p. 4444 (1951).
Slomka et al.: J. Am. Pharm. Assn. 40: 47–51 (1951).

ALEX MAZEL, Primary Examiner

J. A. NARCAVAGE, Assistant Examiner

U.S. Cl. X.R.

260—247.2 B, 247.7 C, 376.3, 490, 570.5 CA; 424—248, 274, 311, 330